METHOD OF PRODUCING MAGNETIC HEADS WITH BONDING GLASS GAP SPACERS
Original Filed Sept. 11, 1956

INVENTOR.
SIMON DUINKER
JULES BOS
BY
Frank R. Jeifari
AGENT 3,145,453

METHOD OF PRODUCING MAGNETIC HEADS WITH BONDING GLASS GAP SPACERS

Simon Duinker and Jules Bos, Eindhoven, Netherlands, assignors, by mesne assignments, to North American Philips Company, Inc., New York, N.Y., a corporation of Delaware Original application Sept. 11, 1956, Ser. No. 609,284, now Patent No. 3,024,318, dated Mar. 6, 1962. Divided and this application May 8, 1961, Ser. No. 114,273
Claims priority, application Netherlands Oct. 4, 1955
6 Claims. (Cl. 29—155.5)

Figures 1, 2:
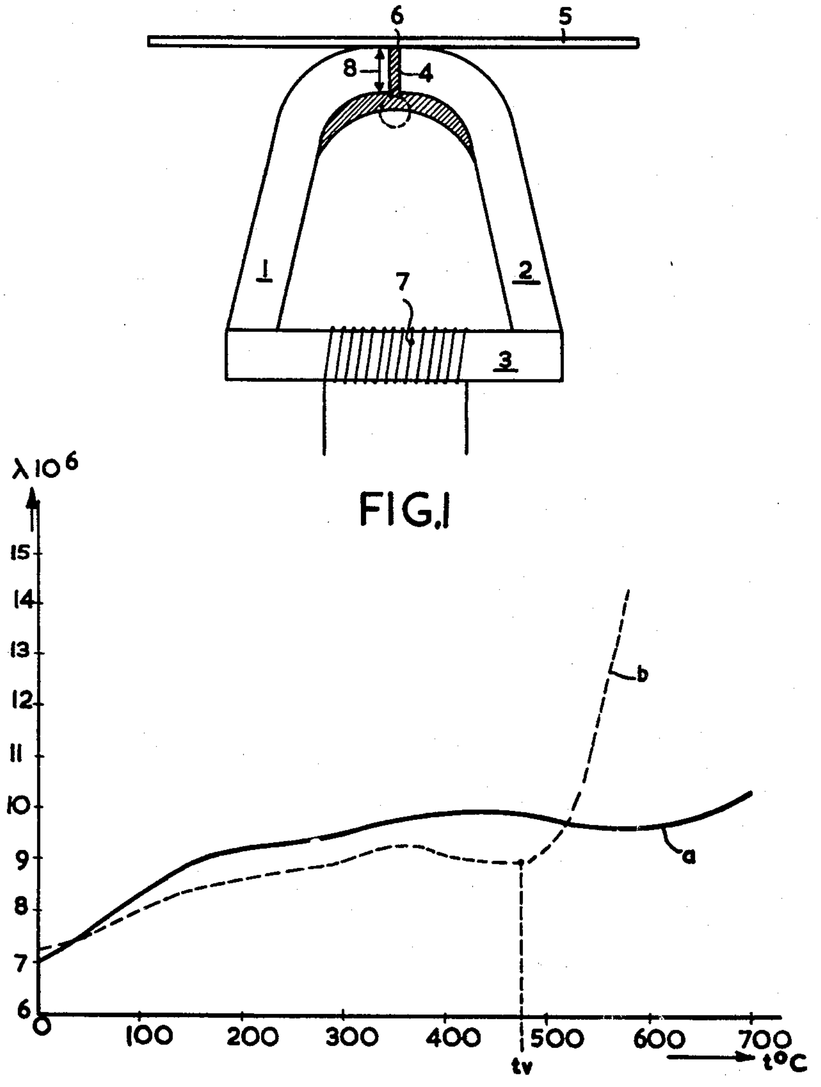

This application is a division of application Serial No. 609,284, filed September 11, 1956, now Patent No. 3,024,318.

The present invention relates to annular heads for magnetic recording and/or reproducing apparatus. More particularly, the invention is concerned with such heads which comprise at least two circuit parts of sintered ferromagnetic oxide material (ferrite) between which an effective gap is formed and includes the improvement of filling said gap with glass, the glass serving as nonmagnetic material to protect the effective gap and also to join or bond the two circuit parts to one another mechanically.

The term "annular head for a magnetic recorder" as used herein is to be understood to mean a magnetic recorder head, the circuit parts of which are so shaped that, when assembled, they enclose a central space in which one or more coils can be arranged.

Generally, the non-magnetic material which fills the effective gap, i.e., the gap past which the carrier of the magnetic recordings is guided, consists of a foil-shaped spacing plate made of a non-magnetic metal for example beryllium copper, the thickness of which fulfills the requirements to be satisfied by the width of the gap. In the present state of the art with respect to magnetic recordings, these requirements have become comparatively exacting and the disadvantages attendant on the use of such distance foils during manufacture are becoming increasingly marked. Even discounting the manufacturing difficulties, however, such plates having a thickness of a few microns are very vulnerable owing to their size and, in addition, any burrs produced on a plate become comparatively significant in ensuring a good connection of the circuit parts.

In order to obviate these disadvantages, it has already been suggested to use as the non-magnetic material synthetic substances which are provided in the liquid state and then are hardened and which also mechanically connect together the two circuit parts. As examples of such materials we may mention ethoxulin resin and poly-ester resin.

Since the material is provided in the liquid state, it is enabled to fill up the space between the surfaces bounding the effective gap, so that a good connection is automatically ensured. In addition, after hardening of the material, the two circuit parts are joined to one another to a certain extent, the ultimate fixation, however, requiring the use of other means, such as pressure discs or lateral springs.

However, the use of these synthetic substances entails a number of disadvantages. The use of further means to ensure the ultimate fixation has already been mentioned. It is also found that the synthetic substances, due to their low heat resistance, are comparatively rapidly worn off during operation, in which a comparatively large amount of heat is generated by the friction between the carrier of the magnetic recordings and the magnetic recorder head, so that the edges of the gap are deprived of the protective action of the non-magnetic material in the gap. It has been found that the unprotected edges of the ferrite are chipped by the wearing action of the magnetic recording carrier. It is also very difficult if not impossible to produce small gap-widths (of the order of magnitude of a few microns) and to adjust the desired thickness.

In order to avoid these difficulties, it has been proposed to use glass as the non-magnetic material. Thus part of the said difficulties, i.e., those with respect to achieving small widths and adjusting the desired thickness, are actually obviated. However, the chipping of the edges of the ferrite is found not to be avoided in the proposed magnetic recorder head.

According to the invention, this last disadvantage is obviated in that as the non-magnetic material use is made of a glass the coefficient of expansion of which, for the temperature at which the magnetic recorder head is used, is equal as far as possible to the corresponding coefficient of expansion of the ferromagnetic material from which the said circuit parts of the magnetic recorder head are made, for example does not differ therefrom by more than 5%.

The invention is based on the recognition of the fact that, even if in the finished product there is a good adherence between the ferromagnetic circuit parts of the magnetic recorder head and the glass, for which adherence a difference in the coefficients of expansion of at least 30% is permissible, the differences in the coefficients of expansion introduce tensions in the glass and in the ferrite owing to which the ferrite edges of the effective gap will show chipping under the action of the mechanical forces exerted by the magnetic recording carrier in operation. It is also found that these tensions give rise to difficulty in manufacture when polishing the pick-up ferrite surface of the magnetic recorder head. Truly flat-ground pick-up surfaces in the proximity of the air-gap are unattainable in practice.

The invention also relates to a method of manufacturing magnetic recorder heads in accordance with the invention. According to the invention, a glass shim is interposed between the polished ferrite gap surfaces which has a coefficient of expansion at the said temperature which is as far as possible to equal to that of the ferromagnetic material, the thickness of the shim exceeding the ultimately desired gap-width by a few percents, after which the assembly is heated to a temperature lying in the softening range of the glass and subsequently is compressed at a temperature lying in this softening range under a pressure such that, after hardening of the glass, the correct gap-width is achieved.

Obviously the magnitude and the time of action of the force depend upon the properties of the glass used, upon the cross-sectional area of the magnetic circuit at the effective gap and also upon the temperature at which the force is exerted.

It has been found that, when using sintered ferromagnetic oxide material for the circuit parts of the magnetic recorder head, the glass adherence obtained has a strength which is of the same order of magnitude as that of the circuit parts themselves.

The invention will now be described in detail with reference to the figures of the accompanying drawings, in which:

FIG. 1 shows an annular magnetic recorder head in accordance with the invention, and FIG. 2 is a curve illustrating the invention.

In FIG. 1, an annular magnetic recorder head comprises two identical circuit parts 1 and 2 and a closing yoke 3. The air-gap 4 formed between the circuit parts 1 and 2 past which the carrier of the magnetic recording 5 is moved, is filled with a non-magnetic material 6, in this case with glass, the coefficient of expansion of which at the above-mentioned temperature is substantially equal to that of the material from which the circuit parts 1, 2 and 3 are made. In the embodiment shown, a coil 7 is provided on the circuit part 3. In the embodiment shown, the glass which is used as the non-magnetic material is not restricted to the air-gap 4, but also fills part of the central space produced by the circuit parts 1, 2 and 3. Such an additional amount of glass imparts an additional rigidity to the circuit in the vicinity of the air-gap 4 and also enables the height of the air gap designated 8 in the figure to be reduced by grinding to a desirably very small value without the risk of a material decrease of the strength of the circuit in the proximity of the air-gap.

This additional amount of glass can be provided in a simple manner in that, prior to heating, a glass rod of the same kind of glass which is used as the non-magnetic material is arranged at the inner side of the ferromagnetic circuit parallel to and in close proximity to the air-gap (this rod is shown diagrammatically in FIG. 1 by a broken circle). During heating, the glass spreads to form a layer as shown in FIG. 1.

An example of a suitable combination is:

FERROMAGNETIC OXIDE MATERIAL

*Composition*

| | Mol percent |
|---|---|
| MnO | 24.1 |
| ZnO | 23.4 |
| FeO | 2.3 |
| $Fe_2O_3$ | 48.8 |
| $SiO_2$ | 1.3 |

Coefficient of expansion: $9.3\times10^{-6}$ between 0° C. and 40° C.

GLASS

*Composition*

| | Percent by weight |
|---|---|
| $SiO_2$ | 56.2 |
| $Na_2O$ | 7.6 |
| $K_2O$ | 4.5 |
| PbO | 30.0 |
| $Al_2O_3$ | 1.2 |
| $Sb_2O_3$ | 0.3 |
| MnO | 0.25 |

Coefficient of expansion: $9.2\times10^{-6}$ between 0° C. and 40° C.

As another example we may mention:

FERROMAGNETIC OXIDE MATERIAL

*Composition*

| | Mol percent |
|---|---|
| NiO | 17.5 |
| ZnO | 33.2 |
| $Fe_2O_3$ | 49.0 |
| $SiO_2$ | 0.3 |

Coefficient of expansion: $7.1\times10^{-6}$ between 0° C. and 40° C.

GLASS

*Composition*

| | Percent by weight |
|---|---|
| $SiO_2$ | 72.5 |
| $Na_2O$ | 11.5 |
| CaO | 10.0 |
| MgO | 3.3 |
| $Al_2O_3$ | 2.5 |
| $K_2O$ | 0.2 |

Coefficient of expansion: $7.3\times10^{-6}$ between 0° C. and 40° C.

Tests have confirmed that, provided the requirement with respect to the coefficient of expansion is satisfied, any other combination of a ferromagnetic oxide material and a glass (for example lime-glass, lead-glass, baryte glass;

this latter kind of glass contains from 10% to 30% by weight of BaO) produces satisfactory results. It should be noted that the term "Glass" is used herein in the broadest sense of the word. Compositions which frequently are referred to as enamel or glaze can be used for the desired object. As an example we may mention an enamel of the following composition:

| | Percent by weight |
|---|---|
| PbO | 80 |
| $B_2O_3$ | 16 |
| ZnO | 4 |

Coefficient of expansion: $10.5\times10^{-6}$ between 0° C. and 40° C. It has been found that an enamel of this composition can be combined satisfactorily with a ferromagnetic oxide material of, for example, the following composition:

| | Mol percent |
|---|---|
| MnO | 30 |
| ZnO | 18 |
| $Fe_2O_3$ | 52 |

Coefficient of expansion: $10.0\times10^{-6}$ between 0° C. and 40° C., or of the following composition:

| | Mol percent |
|---|---|
| MnO | 37 |
| ZnO | 10 |
| $Fe_2O_3$ | 53 |

Coefficient of expansion: $10.2\times10^{-6}$ between 0° C. and 40° C.

However, if the ferromagnetic oxide material of the second example having a coefficient of expansion of $7.1\times10^{-6}$ is combined with the glass of the first example having a coefficient of expansion of $9.2\times10^{-6}$, although a very firm adherence is achieved between the glass and the circuit parts, machining the pick-up ferrite surface proves to give rise to great difficulties, while it is also found that, after operation for a few hours, the pick-up ferrite surface of the head is heavily damaged and completely unsuited for further operation.

The same applies to an even higher extent to the combination of the ferromagnetic oxide material of the first example and the glass of the second example.

It has been found that machining the magnetic recorder head, in this case polishing the pick-up ferrite surfaces, is materially facilitated and also that the resistance of the ferrite edges of the effective gap to the mechanical forces exerted by the carrier of the magnetic recordings during operation is improved, if the two coefficients of expansion are as far as possible equal to one another not only at the temperature at which the magnetic recorder head is used, but also over the entire temperature range lying between the temperature at which the magnetic recorder head is used and the temperature at which the glass begins to soften.

When the coefficients of expansion are equal to one another at the temperature at which the magnetic recorder head is used (with a tolerance of 5%), the tensions occurring in the glass are small, thus preventing the production of strains in the ferrite which would also tend to facilitate chipping of the ferrite edges of the gap by the mechanical forces exerted by the operation of the magnetic recording carrier; when the coefficients of expansion are equal through the entire above temperature interval (with a tolerance of 10% except at the temperature at which the magnetic recorder head is used) these tensions prove to be substantially entirely eliminated.

FIG. 2 illustrates an example of a suitable combination of materials, the coefficients of expansion of which show satisfactory agreement in the said temperature interval.

In this figure, the (linear) coefficient of expansion of a λ sintered ferromagnetic oxide material of the following composition (see the above second example):

| | Mol percent |
|---|---|
| NiO | 17.5 |
| ZnO | 33.2 |
| $Fe_2O_3$ | 49.0 |
| $SiO_2$ | 0.3 |

is plotted as a fuction of the temperature $t$ in degrees C. The curve showing the said relationship is designated $a$ in the figure.

In this figure the coefficient of expansion of a lime glass is also plotted as a function of the temperature, the glass having the following composition (see also the above second example):

| | Percent by weight |
|---|---|
| $SiO_2$ | 72.5 |
| $Na_2O$ | 11.5 |
| CaO | 10.0 |
| MgO | 3.3 |
| $Al_2O_3$ | 2.5 |
| $K_2O$ | 0.2 |

The curve showing this relationship is designated $b$ in the figure. The temperature at which the glass becomes plastic is indicated by $t_v$. It will be seen from the figure that the temperature range situated between the temperature at which the magnetic recorder head is used (room temperature) and the temperature at which the glass begins to change its state ($t_v$) the two coefficients of expansion are in very good agreement.

What is claimed is:

1. A method of manufacturing an annular magnetic head having at least two circuit parts composed of ferrite and an effective gap between said parts, each of said parts having at least one gap surface, comprising the steps of polishing the gap surfaces on said circuit parts, interposing a glass shim directly between and contacting the polished gap surfaces, said shim having a thickness slightly exceeding the desired gap width, heating the resultant assembly to a temperature lying in the softening range of the glass and compressing the two circuit parts against the glass shim at a temperature in said softening range until the desired gap width is achieved, said glass acting upon hardening as a gap spacer and as a bonder for the circuit parts.

2. A method of manufacturing an annular magnetic head having at least two circuit parts composed of ferrite and an effective gap between said parts, each circuit part having at least one gap surface, comprising the steps of interposing a glass shim directly between and contacting the gap surfaces, said glass shim having a coefficient of expansion at the temperature at which the head is to be operated which is substantially equal to that of the ferrite and having a thickness slightly exceeding the desired gap width, heating the resultant assembly to a temperature lying in the softening range of the glass and compressing the circuit parts against the glass shim at a temperature in said softening range until the desired gap width is achieved, said glass acting upon hardening as a gap spacer and as a bonder for the circuit parts.

3. A method of manufacturing an annular magnetic head having at least two circuit parts composed of ferrite and an effective gap between said parts, each circuit part having at least one gap surface, comprising the steps of interposing a glass shim directly between and contacting the gap surfaces, said glass shim having a coefficient of expansion substantially equal to the coefficient of expansion of said ferrite throughout the entire temperature range lying between the temperature at which the head is to be used and the temperature at which the glass begins to soften and having a thickness slightly exceeding the desired gap width, heating the resultant assembly to a temperature lying in the softening range of the glass and compressing the circuit parts against the glass shim at a temperature in said softening range until the desired gap width is achieved, said glass acting upon hardening as a gap spacer and as a bonder for the circuit parts.

4. A method of manufacturing an annular magnetic head having at least two circuit parts composed of ferrite and an effective gap between said parts, each circuit part having at least one gap surface, comprising the steps of polishing the gap surfaces on said circuit parts, interposing a glass shim directly between and contacting the polished gap surfaces, said shim having a thickness slightly exceeding the desired gap width, placing a glass rod of the same composition as the glass foil in the inner portion of the annular head in close proximity to the effective air gap, heating the resultant assembly including said glass rod and glass foil to a temperature lying in the softening range of the glass and compressing the two circuit parts against the glass shim at a temperature in said softening range until the desired gap width is achieved, said glass acting upon hardening as a gap spacer and as a bonder for the circuit parts.

5. A method of manufacturing an annular magnetic head having at least two circuit parts composed of ferrite and an effective gap between said parts, each circuit part having at least one gap surface, comprising the steps of interposing a glass shim directly between and contacting the gap surfaces on said circuit parts, and shim having a thickness slightly exceeding the desired gap width, placing a glass rod of the same composition as the glass shim in the inner portion of the annular head in close proximity to the effective air gap, said glass shim and glass rod both having a coefficient of expansion at the temperature at which the head is to be operated which is substantially equal to that of the ferrite, heating the resultant assembly including the glass rod and the glass shim to a temperature lying in the softening range of the glass and compressing the circuit parts against the glass shim at a temperature in said softening range until the desired gap width is achieved, said glass acting upon hardening as a gap spacer and as a bonder for the circuit parts.

6. A method of manufacturing an annular magnetic head having at least two circuit parts composed of ferrite and an effective gap between said parts, comprising the steps of interposing a glass shim directly between and contacting the gap surfaces on said circuit parts, said shim having a thickness slightly exceeding the desired gap width, placing a glass rod of the same composition as the glass shim in the inner portion of the annular head in close proximity to the effective air gap, said glass shim and glass rod both having a coefficient of expansion substantially equal to the coefficient of expansion of said ferrite throughout the entire temperature range lying between the temperature at which the head is to be used and the temperature at which the glass begins to soften, heating the resultant assembly including the glass rod and the glass shim to a temperature lying in the softening range of the glass and compressing the circuit parts against the glass shim at a temperature in said softening range until the desired gap width is achieved, said glass acting upon hardening as a gap spacer and as a bonder for the circuit parts.

References Cited in the file of this patent

UNITED STATES PATENTS

| | | |
|---|---|---|
| 2,319,775 | Mittermaier | May 18, 1943 |
| 2,346,555 | Cobb | Apr. 11, 1944 |
| 2,555,110 | Bobb | May 29, 1951 |
| 2,703,661 | Taylor | Mar. 8, 1955 |
| 2,728,054 | Albers-Schoenberg | Dec. 20, 1955 |
| 2,785,038 | Ferber | Mar. 12, 1957 |
| 2,919,312 | Rosenberger et al. | Dec. 29, 1959 |
| 2,933,565 | Neumann | Apr. 19, 1960 |

UNITED STATES PATENT OFFICE
CERTIFICATE OF CORRECTION

Patent No. 3,145,453 August 25, 1964

Simon Duinker et al.

It is hereby certified that error appears in the above numbered patent requiring correction and that the said Letters Patent should read as corrected below.

Column 6, line 28, for "and" read -- said --.

Signed and sealed this 29th day of December 1964.

(SEAL)
Attest:

ERNEST W. SWIDER
Attesting Officer

EDWARD J. BRENNER
Commissioner of Patents